United States Patent [19]

Pauly et al.

[11] Patent Number: 5,159,359
[45] Date of Patent: Oct. 27, 1992

[54] EYEGLASS FRAME WITH SPRING BIASED NOSE BRIDGE

[75] Inventors: Pascal Pauly, Amilly; Christian Hallot, Belleville sur Meuse, both of France

[73] Assignee: Essilor International Compagnie Generale, Creteil, France

[21] Appl. No.: 683,522

[22] Filed: Apr. 9, 1991

Related U.S. Application Data

[63] Continuation of Ser. No. 448,634, Dec. 11, 1989, abandoned.

[30] Foreign Application Priority Data

Dec. 15, 1988 [FR] France ................................. 88 16553
Oct. 12, 1989 [FR] France ................................. 89 13321

[51] Int. Cl.⁵ ............................................... G02C 5/04
[52] U.S. Cl. ..................................... 351/128; 351/137; 351/124
[58] Field of Search ..................... 351/137, 77, 71, 88, 351/128, 136, 124

[56] References Cited

U.S. PATENT DOCUMENTS 4,280,758 7/1981 Flader .................................. 351/55
4,802,753 2/1989 Lhospice .............................. 351/88

FOREIGN PATENT DOCUMENTS 671535 10/1965 Belgium .
0262020 3/1988 European Pat. Off. .
2123976 2/1984 United Kingdom .

Primary Examiner—Paul M. Dzierzynski
Attorney, Agent, or Firm—Longacre & White

[57] ABSTRACT

An eyeglass frame comprises a bridge in which is a housing in which a slide member is movably mounted. A spring accommodated in the housing urges the slide member outwardly. A nose pad support is fixed to the slide member and nose pads are fixed to the nose pad support. The eyeglass frame makes it possible to minimize contusions and distortion of the nose pad support in the event of impact.

22 Claims, 2 Drawing Sheets

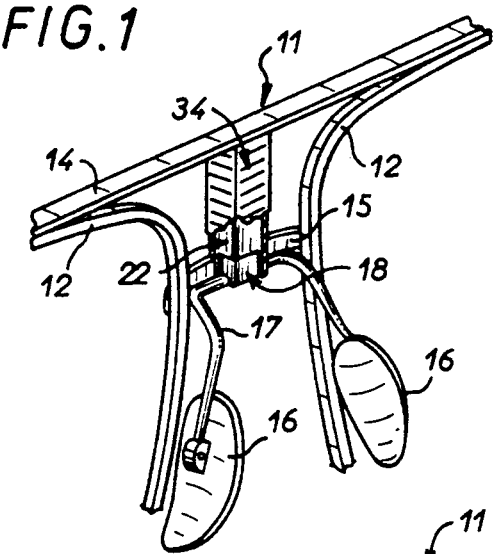
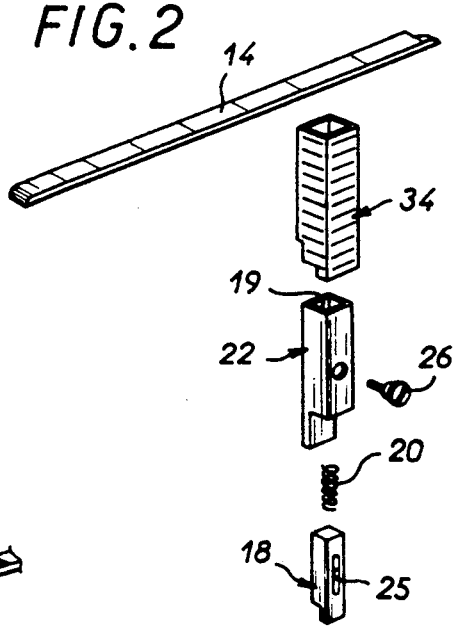
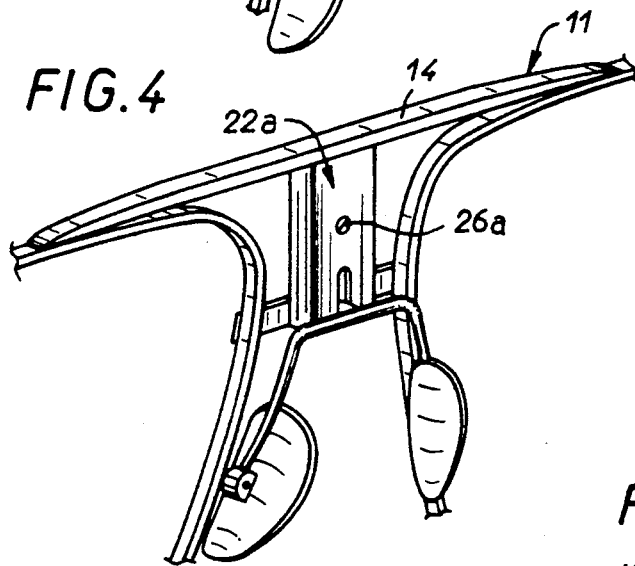
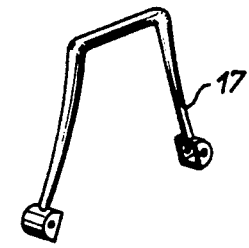
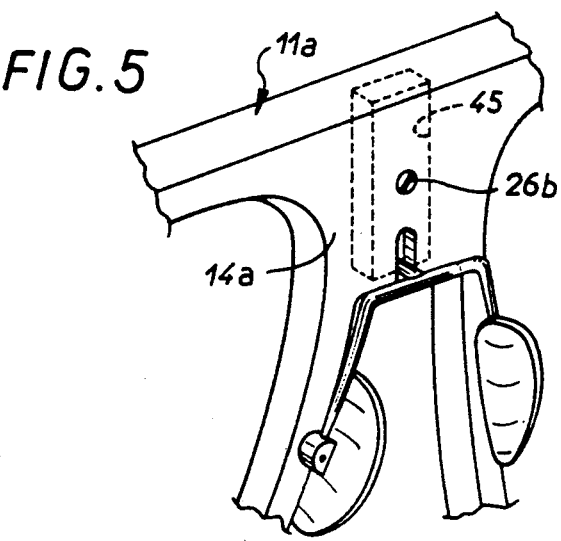
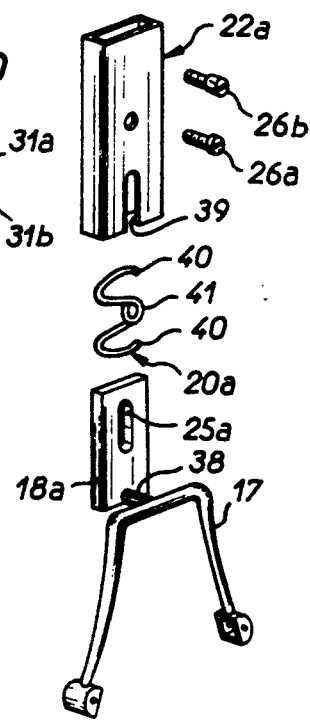

EYEGLASS FRAME WITH SPRING BIASED NOSE BRIDGE

This application is a continuation of Ser. No. 448,634, filed Dec. 11, 1989 now abandoned.

BACKGROUND OF THE INVENTION

1. Field of the invention

The invention concerns a novel eyeglass frame and in particular an improvement reducing the risks of event of an impact.

2. Description of the prior art

Eyeglass frames are provided with nose pads, i.e. small convex members, preferably articulated to their support, located under the bridge joining the two "rims" of the lenses so as to come into contact with the nose. The two pads are shaped to match the shape of the nose as closely as possible and so to increase the area over which the eyeglasses rest on the nose. This makes the eyeglasses more stable and more comfortable to wear but in the event of an impact it is usually at this level that contusions occur, associated with deformation of the nose pad support.

The basic idea of the invention is to provide a mobile assembly adapted to move in a direction perpendicular to that of the bridge joining the two "rims" and including at least one nose pad.

SUMMARY OF THE INVENTION

The present invention consists in an eyeglass frame comprising a bridge, a housing on the bridge, a slide member movably mounted in the housing, a spring accommodated in the housing to urge the slide member outwardly therefrom, a nose pad support fixed to the slide member and nose pads fixed to the nose pad support.

Some known eyeglass frames have twinned nose pads, that is to say nose pads that are joined together at the top or attached, preferably articulated, to a support in the general shape of an inverted letter U. The invention is particularly applicable to frames of this kind. In this case the two twinned nose pads are mounted on a common slide member.

The invention is advantageously applicable to metal or plastics material eyeglass frames.

The invention will be better understood and other advantages of the invention will emerge more clearly from the following description of various embodiments of eyeglasses in accordance with the invention given by way of example only and with reference to the non-limiting appended drawings.

BRIEF DESCRIPTION OF THE DRAWINGS

FIG. 1 is a partial view of an eyeglass frame in accordance with the invention.

FIG. 2 is an exploded perspective view of the mechanism in accordance with the invention from FIG. 1.

FIGS. 3a and 3b are alternative embodiments of the slide member from FIG. 2.

FIG. 4 is a view analogous to FIG. 1 showing an alternative embodiment.

FIG. 5 shows the same embodiment as FIG. 4 but fitted to another type frame.

FIG. 6 is a view analogous to FIG. 2 showing the component parts of the FIGS. 4 and 5 embodiment.

DETAILED DESCRIPTION OF THE INVENTION

Figure 7:
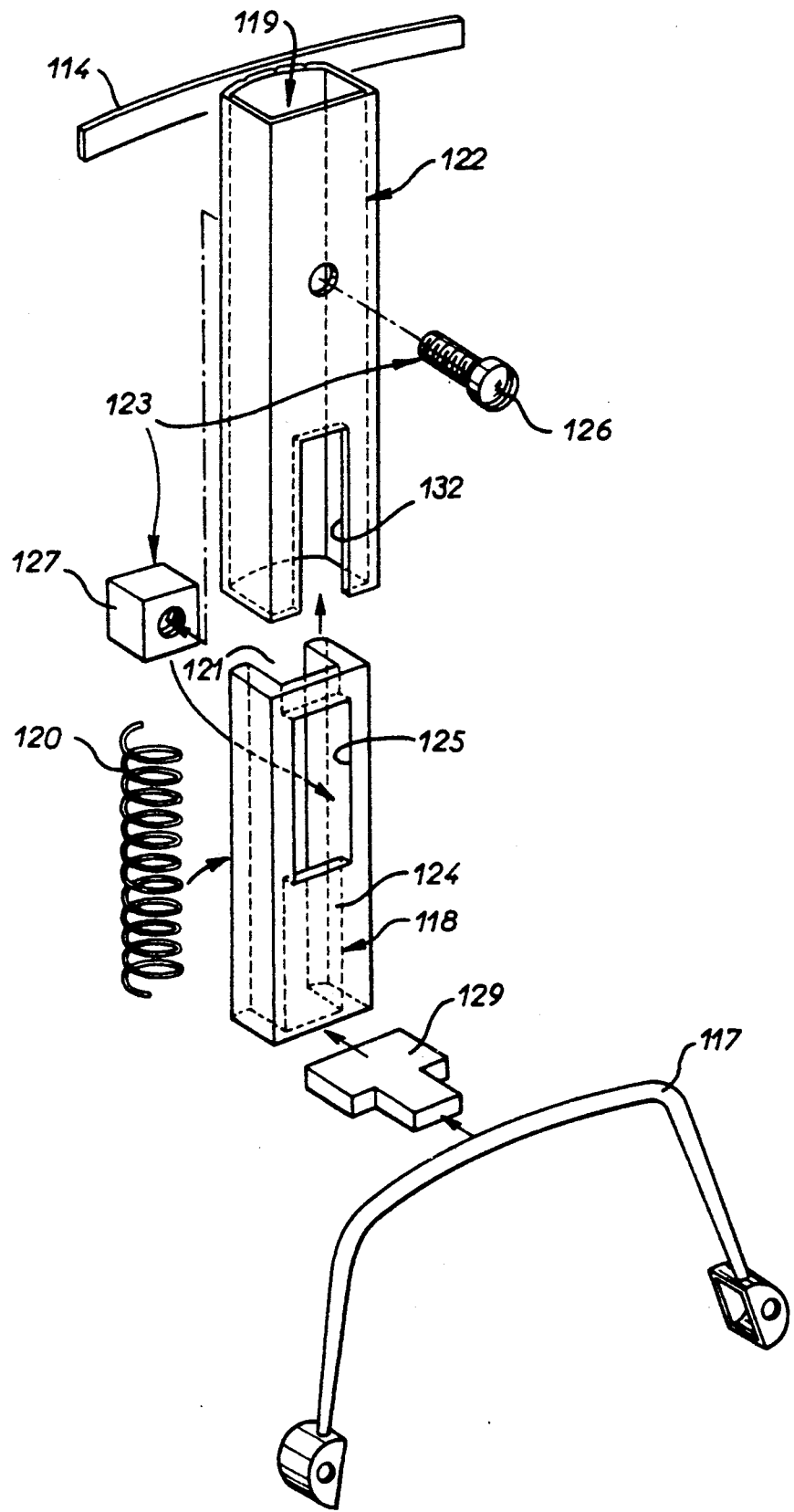
FIG. 7 is an exploded perspective view of another embodiment of damper mechanism carrying the nose pad support.

FIGS. 1 and 2 in particular show the central part of a metal eyeglass frame 11 comprising two "rims" 12 for the lenses joined together by a double bridge made up of two straight metal bars, a top bridge 14 and a bottom bridge 15, the latter being closest to the nose. The frame further comprises two nose pads 16 articulated to a metal support 17 in the shape of an inverted letter U.

In accordance with the invention the support 17 is fixed (in this instance welded) to the lower part of a slide member 18 mounted to move in a housing 19 provided on the double bridge 14, 15 and a spring 20 is disposed in this housing to urge the slide member externally thereof, that is to say downwards, towards the nose. In the example shown the housing 19 is defined by the internal volume of a casing 22 in the form of a square cross-section tube. This casing accommodates the spring and the slide member 18; it is fastened to the double bridge, in this instance welded between the top bridge 14 and the bottom bridge 15. The upper end of the casing 22 is welded beneath the bar constituting the top bridge 14, which therefore constitutes the bearing point of the spring 20, which is a conventional coil spring.

In the FIG. 2 example, the slide member comprises a longitudinal slot 25 and a locking member in the form of a screw 26 fixed into the wall of said casing projects into the longitudinal slot 25. The movement of the slide member within the casing is therefore limited in a simple way by the cooperation of the screw 26 and the slot 25.

As shown in FIG. 3a, the slide member 18a may be a U-shape channel member defining a groove inside which is fixed at least one abutment member, for example a ball 28 welded to the interior of the section. As previously, the locking member is a screw 26.

In another embodiment (FIG. 3b) the slide member 18b incorporates a lateral cavity 30 in the form of a transverse groove defining two opposed abutment members 31a, 31b cooperating with the screw 26 which projects into the cavity.

In all the foregoing examples the casing 22 is preferably covered with a tubular sheath 34 of rubber or a like elastomer material.

The embodiment of FIGS. 4 through 6 has the advantage of being suitable both for a metal frame 11 like that from FIG. 1 (see FIG. 4) and a plastics material frame 11a (see FIG. 5) in which the solid, single-piece bridge 14a is molded at the same time as the "rims".

With regard to the mechanism itself, it comprises a casing 22a, a spring 20a and a slide member 18a incorporating a slot 25a cooperating with a screw 26a or 26b fixed into the wall of the casing 22a. The nose pad support 17 is welded to the lower part of the mobile assembly by means of a small rod 38 inserted into an aperture 39 in the casing, open at the bottom. To enable the casing and the slide member to be made flatter, the spring 20a may be the shape shown in FIG. 6. It essentially comprises two metal branches 40, each hairpin-shape, joined together to constitute a kind of M-shape. The two branches are here linked by at least one flat turn 41.

In FIG. 5 the casing is mounted inside the plastics material bridge 14a, and to enable this an open-bottom cavity 45 is formed in the bridge, the shape and size of this cavity matching those of the casing 22a. The latter is fixed in it by the screw 26b forming the locking member. The head of this screw advantageously has an unthreaded cylindrical part which is housed in a corresponding hole formed in the plastics material bridge. The screw 26b thus has a two-fold function.

In the normal position the mobile assembly project to the maximum extent from the casing 22, towards the nose. The nose pads 16 rest on the nose. In the event of an impact to the frame, the latter might move down towards the nose, but the impact is then damped because of the relative movement between the bridge and the slide member carrying the nose pad support; this movement compresses the spring 20.

FIG. 7 shows only the metal bridge 114 of the eyeglass frame joining the "rims" of the frame and to which is welded, substantially perpendicular thereto, a tubular casing 122 within which is defined a housing 119 accommodating a slide member 118 to the lower end of which is fixed a nose pad support 117. In this example the support 117 is stirrup-shape and adapted to carry two nose pads (not shown). The casing 122 also accommodates a spring 120 adapted to urge the slide member towards the outside of the housing 119. The slide member 118 projects from the open lower end of the casing 122 and the spring 120 urges it towards the outside of the housing.

The slide member 118 is shaped to feature a longitudinally open space 121 and the spring 120 is accommodated in this space. It is a coil spring with its ends bearing on an abutment member 123 fixed to the casing 122 and a plate 129 or the like fixed to the lower end of the slide member 118, that is the end projecting from the housing 119. To be more precise, the plate 129 is welded to the lower end of the slide member and the nose pad support 117 is welded to the plate 129. A notch 132 is formed in the wall of the casing 122, extending upwardly from its lower end, and the plate 129 is shaped so that it slides in this notch, which guides such sliding.

The slide member 118 essentially comprises a straight section with a U-shape profile. The inside transverse cross-section of the housing 119 has a shape and size corresponding to those of the straight section constituting the slide member 118. The latter further incorporates a straight slot 125 formed in the base surface 124 of the U-shape profile section whereby the abutment member 123 fixed into the ajoining wall of the casing is inserted in the slot 125 to constitute the other bearing member for the spring 120. The abutment member 123 comprises a bolt 126 and a nut 127 mounted through the wall of the casing 122. The nut 127 is inserted into the open space 121 of the slide member through the slot 125. As shown, the nut is advantageously cubic or rectangular parallelepiped shape for superior guiding of the slide member. The shape of the slide member facilitates the accommodation of a coil spring in the casing.

The arrangement that has just been described enables the use of a longer coil spring, other things being equal, and the spring therefore functions under better conditions. This increases the reliability of the device.

There is claimed:

1. Eyeglass frame comprising a bridge, a housing on said bridge, an assembly comprising a nose pad support, nose pads fixed to said nose pad support and a slide member fixed to said nose pad support, said slide member being slidably mounted in said housing between two opposite abutment means defining a first opposite end position at which said slide member is in an outermost location with respect to said housing and a second opposite end position at which said slide member is in an innermost location with respect to said housing, and further comprising a shock absorbing spring accommodated in said housing to resiliently urge said slide member towards said first opposite end position, wherein said assembly undergoes damped oscillating displacements with respect to said frame, limited only by said opposite abutment means, in response to an impact of shock on said frame.

2. Eyeglass frame according to claim 1 comprising a casing attached to said bridge, the interior of said casing defining said housing.

3. Eyeglass frame according to claim 2 wherein said slide member incorporates a longitudinal groove and further comprising a locking member fixed to a wall of said casing and projecting into said groove.

4. Eyeglass frame according to claim 3 wherein said locking member is a screw.

5. Eyeglass frame according to claim 2 wherein said slide member has a U-shape cross-section and further comprising at least one abutment member fixed to the interior of a groove and a locking member fixed to a wall of said casing and projecting into said groove.

6. Eyeglass frame according to claim 5 wherein said abutment member is a ball welded to the inside of said slide member.

7. Eyeglass frame according to claim 5 wherein said locking member is a screw.

8. Eyeglass frame according to claim 2 wherein said slide member includes a lateral cavity defining a groove having two opposed abutment members and further comprising a locking member fixed to a wall of said casing and projecting into said groove.

9. Eyeglass frame according to claim 2 wherein said bridge is metal and said casing is welded to said bridge.

10. Eyeglass frame according to claim 9 wherein said bridge comprises two substantially parallel bars and said casing is welded between said bars.

11. Eyeglass frame according to claim 9 wherein said casing is covered with a tubular sheath made from rubber or a like elastomer material.

12. Eyeglass frame according to claim 2 wherein said casing is flat in shape and said spring comprises two metal branches.

13. Eyeglass frame according to claim 12 wherein said two branches are hairpin shape.

14. Eyeglass frame according to claim 12 wherein said two branches are joined by at least one flat turn.

15. Eyeglass frame according to claim 1 wherein said bridge is made from a plastics material and comprises an open-bottom cavity adapted by virtue of its shape and size to accommodate said casing which is fixed into said cavity.

16. Eyeglass frame according to claim 15 further comprising a locking member fixed to a wall of said casing and projecting into said groove, said locking member comprising a screw and said bridge incorporating a hole adapted to receive a head of said screw, which is adapted to immobilize said casing in said cavity.

17. Eyeglass frame according to claim 1 wherein said slide member incorporates a longitudinally open space accommodating said spring.

18. Eyeglass frame according to claim 17 wherein said slide member is straight and has a U-shape cross-section and said casing is tubular, has an internal cross-section corresponding to that of said slide member and has said slide member mounted in it.

19. Eyeglass frame according to claim 18 wherein said slide member has a slot in a bottom surface, an abutment member is fixed into an adjacent wall of said casing and inserted into said slot, a plate is fixed to the end of said slide member and projects out of said housing and said spring is mounted in compression between said abutment member and said plate.

20. Eyeglass frame according to claim 19 wherein said nose pad support is fixed to said plate.

21. Eyeglass frame according to claim 19 wherein said housing has a notch extending into one wall from one end and said plate is adapted to slide in said notch.

22. Eyeglass frame according to claim 19 wherein said abutment member is formed by a nut and bolt passing through a wall of said housing and said nut is inserted in the hollow space inside said slide member through said slot and said spring bears on said nut.

* * * * *